(12) United States Patent
Cariffe

(10) Patent No.: US 6,561,422 B1
(45) Date of Patent: May 13, 2003

(54) SYSTEM AND METHOD FOR HIGH-CONTRAST MARKING AND READING

(75) Inventor: Alan E. Cariffe, San Diego, CA (US)

(73) Assignee: Hewlett-Packard Development Company, Palo Alto, CA (US)

( * ) Notice: Subject to any disclaimer, the term of this patent is extended or adjusted under 35 U.S.C. 154(b) by 0 days.

(21) Appl. No.: 09/303,944

(22) Filed: May 3, 1999

(51) Int. Cl.[7] .............................. G06K 7/10; G06K 7/14
(52) U.S. Cl. ...................... 235/454; 235/469; 235/491; 382/321
(58) Field of Search .................... 235/454, 468, 235/469, 491; 260/271; 382/182, 170, 176, 177, 178, 179, 187, 321; 358/1.18; 707/505, 530, 531, 540, 541

(56) References Cited

U.S. PATENT DOCUMENTS

| | | | | |
|---|---|---|---|---|
| 3,611,291 A | * | 10/1971 | Frank | 382/182 |
| 3,666,946 A | * | 5/1972 | Trimble | 250/271 |
| 3,676,856 A | * | 7/1972 | Manly | 707/531 |
| 3,739,348 A | * | 6/1973 | Manly | 358/1.18 |
| 3,750,112 A | * | 7/1973 | Manly | 358/1.18 |
| 4,249,072 A | * | 2/1981 | Buros | 235/491 |
| 4,889,367 A | * | 12/1989 | Miller | 235/468 X |
| 4,983,817 A | * | 1/1991 | Dolash et al. | 235/491 X |
| 5,181,255 A | * | 1/1993 | Bloomberg | 382/176 |
| 5,502,304 A | * | 3/1996 | Berson et al. | 235/468 X |
| 5,514,860 A | * | 5/1996 | Berson | 235/468 |
| 5,525,798 A | * | 6/1996 | Berson et al. | 235/468 X |
| 5,675,136 A | * | 10/1997 | Keinath et al. | 235/454 X |
| 5,897,648 A | * | 4/1999 | Henderson | 707/530 |
| 5,950,213 A | * | 9/1999 | Iida et al. | 707/505 |
| 5,959,296 A | * | 9/1999 | Cyr et al. | 235/468 X |
| 5,971,276 A | * | 10/1999 | Sano et al. | 235/468 X |
| 6,006,991 A | * | 12/1999 | Faklis et al. | 235/491 X |
| 6,039,257 A | * | 3/2000 | Berson et al. | 235/468 |
| 2002/0102022 A1 | * | 8/2002 | Ma et al. | 382/170 |
| 2003/0026481 A1 | * | 2/2003 | Keskar et al. | 382/187 |

FOREIGN PATENT DOCUMENTS

| | | | |
|---|---|---|---|
| JP | 54-112124 | * | 9/1979 |
| JP | 8-44717 | * | 2/1996 |

* cited by examiner

Primary Examiner—Michael G. Lee
Assistant Examiner—Jared J. Fureman

(57) ABSTRACT

A system and a method for converting markings made on media with a marking agent into a digital form representing the markings. The system of the present invention includes a marking device and an illumination digital scanning device. The marking device can be a manual or machine marking device, each containing the marking agent. The marking agent is dispensed by the marking device onto the media. The marking agent is a chemical that emits a certain radiation frequency set when illuminated by an illumination frequency set. The illumination digital scanning device converts the markings of the marking agent into a digital form. The method of the present invention includes marking the media with the marking agent, illuminating the markings to cause the marking agent to radiate at the radiation frequency set and converting the radiation into a digital form representing the markings.

26 Claims, 4 Drawing Sheets

SYSTEM AND METHOD FOR HIGH-CONTRAST MARKING AND READING

FIELD OF THE INVENTION

The present invention relates in general to marking and reading media and more particularly to a system and a method for converting subsequent marks made on media with a marking agent into a digital form.

BACKGROUND OF THE INVENTION

Documents containing various types of data and printed on a variety of media are widely used to convey information. Frequently these documents are created and then distributed to others for receiving their comments, edits and review. For example, a document created in a word processing application and printed on an inkjet printer may be distributed to and reviewed by others for receiving their edits and comments. Typically, edits and comments are conveyed by placing edit and comment markings directly on the original document. These additional markings can include interlineations, annotations and other additions. These additional markings, which can be alphanumeric characters or other types of symbols, are usually created by a manual marking device (handwriting), such as a pencil, or a machine marking device, such as a typewriter or printer. Whichever type of marking device is used to add the markings to the original document, the marking process results in a new document.

Since the new document contains non-digital information, namely the additional markings, it is difficult to manipulate and distribute the new document to others. One way to distribute the new document is to photocopy it and physically deliver a copy to others. However, because the markings are not in digital form, they are difficult to incorporate into the original document using existing digital applications. Although a digital scanning device can be used to convert the markings into digital form, this method has several disadvantages.

The primary disadvantage of using a digital scanning device is that the results are usually unreliable and unacceptable. This is because the placement of the markings is often between or over original material of the document. This can obscure or mingle the markings with the original material and cause the contrast between the markings and original material to be very low or nonexistent. Consequently, scanning devices usually cannot distinguish between the markings and the original material. This typically creates misinterpreted or ambiguous digital conversions of the markings. Thus, there exists a need for a system and method for accurately and efficiently separating and converting subsequent markings that are made on media into a digital form.

SUMMARY OF THE INVENTION

To overcome the limitations in the prior art as described above, and to overcome other limitations that will become apparent upon reading and understanding the present specification, the present invention is embodied in a system and method for creating markings on media and separating and converting the markings into a digital form. The system of the present invention includes a marking device and an illumination digital scanning device.

The marking device for creating additional markings and subsequent marks can be any suitable marking device, such as a manual marking device or a machine marking device. The marking device preferably contains a marking agent, such as a high-contrast marking agent. The marking device dispenses the marking agent onto the media. The manual marking device can be a manual marking implement, such as a pen for creating handwritten markings. A pen manual marking device preferably contains ink that can be comprised of a high-contrast marking agent or a mixture of the agent with suitable ink. Alternatively, the manual marking device can be a pencil for creating handwritten markings and having suitable pencil writing material, which is typically some type of graphite containing a binder. The pencil writing material can be comprised of the high-contrast marking agent or a mixture of the agent with suitable pencil graphite.

The machine marking device can be a machine capable of printing markings, such as a printer or a typewriter. The machine marking device preferably contains the high-contrast marking agent. For example, for printer marking devices, such as an inkjet printer, the high-contrast marking agent or a mixture of the agent with suitable ink can be used to create the markings. For a typewriter machine marking device, the high-contrast marking agent can be embedded within a typewriter ribbon. For a photovoltaic laser printer operating with laser toner, the high contrast marking agent can be embedded in the laser toner.

The high-contrast marking agent can be any suitable chemical that emits a certain radiation frequency, such as the strongest radiation frequency, when illuminated by an illumination set of wavelengths or frequencies. The illumination and radiation frequencies can be the same or different frequencies depending on the chemical. An illumination digital scanning device can be used to separate and convert the markings created with the high-contrast marking agent into a digital form. In particular, the scanning device emits a set of illumination frequencies which causes the marking agent to radiate at a set of radiation frequencies. If an emitive marking agent is used, the marking agent preferably radiates at a different set of radiation frequencies than the set of frequencies emitted by the scanning device. If a reflective marking agent is used, the marking agent preferably radiates at the same set of radiation frequencies as the set of frequencies emitted by the scanning device. In both cases, high contrast is provided between the markings created with the marking agent and the original material, thereby allowing the scanning device to easily distinguish between the two.

A digital converter, such as a CCD (charge-coupled-device), can be used to convert the detected radiation into digital electronic form, thereby converting the markings into computer readable digital information representing the markings. After conversion, the digital information representing the markings can be easily manipulated by computer software applications, such as optical character recognition (OCR) applications, and widely distributed using electronic messaging. Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not the preceding summary or the following detailed description.

BRIEF DESCRIPTION OF THE DRAWINGS

The present invention can be further understood by reference to the following description and attached drawings that illustrate the preferred embodiment. Other features and advantages will be apparent from the following detailed description of the preferred embodiment, taken in conjunction with the accompanying drawings, which illustrate, by way of example, the principles of the present invention.

Referring now to the drawing in which like reference numbers represent corresponding parts throughout.

DETAILED DESCRIPTION OF THE PREFERRED EMBODIMENTS

Figure 1:
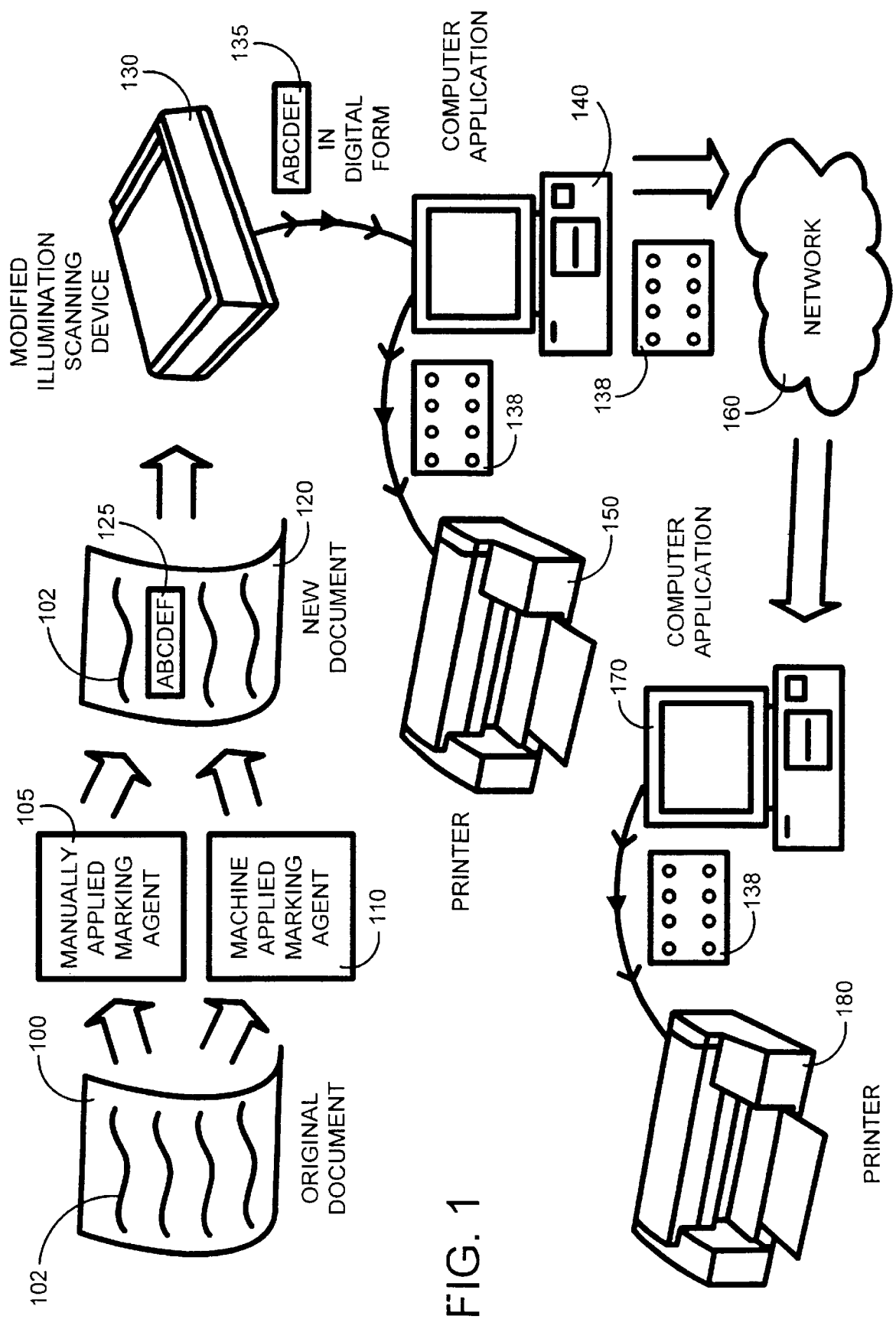
FIG. 1 shows a schematic block diagram of a system and method incorporating the present invention.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

As shown in the drawings for the purposes of illustration, the invention is embodied in a system and method for creating markings on existing documents having original material located thereon and converting the markings into a digital form. Namely, a system and method according to the invention creates handwritten or machine generated subsequent markings on existing documents and accurately and efficiently separates the subsequent markings from the original material and converts at least the subsequent markings into a digital form. The digital form can be computer readable digital information representing the markings. Existing systems and methods have failed to accurately and efficiently separate and convert subsequent markings, such as handwritten annotations that are located between or over the original material of the document, into a digital form.

The problem of separating and converting subsequent markings arises because markings are usually placed between or over the original material, which can inadvertently obscure or combine the subsequent markings with the original material. As a result, contrast between the subsequent markings and the original material can be very low or nonexistent, thereby making it difficult to distinguish between the subsequent markings and the original material. This can create misinterpreted or ambiguous digital conversions of the subsequent markings.

A system and method according to the present invention accurately and efficiently separates the subsequent markings from the original material and converts the subsequent markings into a digital form. The present invention utilizes a marking agent that emits a set of radiation frequencies when illuminated by an illumination frequency set to create the subsequent markings. An illumination scanning device separates and converts the markings created with the marking agent into a digital form by emitting the illumination frequencies suitable to excite the marking agent. This causes the marking agent to radiate at the same or different radiation frequencies and provides high contrast between the markings created with the marking agent and the original material, which is not so excited, thereby allowing the scanning device to easily distinguish between two kinds of markings using suitable light filters and detectors.

II. General Overview

FIG. 1 shows a schematic block diagram of a system and method incorporating the present invention. Media or an original document 100 can have original material 102 located thereon, for example, a sheet of paper having computer generated text printed on the paper. As another example, the original document 100 can be paper containing drawings (such as architectural plans) or a photograph on photographic paper.

Markings are placed on the original document 100 using a marking agent, such as a high-contrast marking agent. In general, the markings can include interlineations, annotations, additions, etc. created during review or proof-reading of the original document 100. Typically, these marks are alphanumeric characters but can also be symbols such as mathematical symbols, proofreading marks, shorthand symbols, geometric drawings and lines, foreign language characters and the like. These marks can be added to the original document 100 either manually or by a machine.

A document 105 with manual markings is comprised of the original document 100 with markings applied by a user with a special high-contrast manual marking device. The manual marking device (discussed in detail below) is preferably a manual writing implement, for example, a pen for making handwritten markings, that contains a high-contrast marking agent. The user places handwritten markings comprising the high-contrast marking agent on the original document 100 to create the document 105 with manual markings.

A document 110 with machine markings is comprised of the original document 100 with markings applied by a user with a special high-contrast machine marking device. For example, a printer having the high-contrast marking agent as ink can be used to place the markings on the original document 100. As another example, a typewriter having a ribbon incorporating the high-contrast marking agent can be used to place the markings on the original document 100 and create the document 110 with the machine markings.

The manual and machine marking devices yield a new document 120 with subsequent markings 125 comprised of the high-contrast marking agent and the original material 102. The subsequent markings 125 are shown in FIG. 1 as the letters "ABCDEF" for illustrative purposes only.

In order to convert the subsequent markings 125 into a digital form, the new document 120 is processed by an illumination digital scanning device 130. In general, the scanning device 130 illuminates the high-contrast marking agent with a set of radiation frequencies that causes the marking agent to radiate at the same or different radiation frequencies. For instance, if an emitive marking agent is used, the marking agent preferably radiates at a different set of radiation frequencies than the set of frequencies emitted by the scanning device. If a reflective marking agent is used, the marking agent preferably radiates at the same set of radiation frequencies as the set of frequencies emitted by the scanning device.

In one example, the high-contrast marking agent can be a fluorescent red ink that radiates red frequencies of light when illuminated with light of ultraviolet frequencies. When the digital scanning device 130 illuminates the marking agent and causes the marking agent to radiate, a high contrast is created between the original material 102 contained on the original document 100 and the subsequent markings 125. The high contrast is created because the original markings are not so excited to radiate or reflect the illumination frequencies as strongly as the high contrast marking agent.

This high contrast allows the scanning device 130 to separate and easily distinguish between the marks 125 and the original material 102. Essentially, the scanning device 130 primarily detects and scans the subsequent markings 125, thereby allowing for separate processing of the subsequent markings 125 and the original material 102. In addition, the high contrast between the subsequent markings 125 and the original material 102 helps the scanning device 130 and subsequent computer OCR software to avoid misinterpretations and ambiguities caused by subsequent markings 125 that are blended with the original material 102.

The subsequent markings 125 can then be separately captured and converted by any suitable recognition software application into a computer readable or digital form 135 (such as a raster or image format) by the scanning device 130. The recognition applications can include, for example, page-decomposition applications, optical character recognition (OCR) and handwriting recognition programs generally running on the computer 140 connected to the scanning device 130. The recognition application preferably automatically recognizes and converts the raster or image format of digital form 135 into pure text or a geometric vector format, such as fully editable text.

For instance, a new digital document can be created using these applications. The new document can be a digital document 138 (such as a vector format) stored on a host computer 140 containing the recognized digital form 135 of the subsequent markings incorporated with the original material 102 of the original document 100. Alternatively, a document can be created solely containing the digital form 135 of the subsequent markings. It should be noted that the digital form 135 of the subsequent markings can be combined with the digital form of the original material 102 or the original material can be re-processed by the scanning device 130 and re-recognized by the recognition applications. Also, a host printer 150 connected to the host computer 140 can be used to produce a printed hardcopy of the new digital document 138.

Digital documents 135 and 138 can be used, manipulated, shared and electronically distributed by computer applications residing on or in communication with the host computer 140. Sharing and electronically distributing the digital document 138 includes, for example, distribution of the digital document 138 over a local area network (LAN), a wide area network (WAN) or electronic mail systems. In general, an application residing on the host computer 140 can send the digital document 138 over the network 160 to a remote computer 170. The network can be, for example, a cable connecting the host computer 140, via digital or analog telephone lines, wireless communications or other forms of communication to remote computers 170. The remote computer 170 receives the digital document 138 and can manipulate the document using computer applications or print the document using a printer 180. As such, the user of the remote computer 170 has immediate digital access to the subsequent markings made to original document 100 to allow further manipulation by computer applications.

III. Manual Marking Devices

Figure 2:
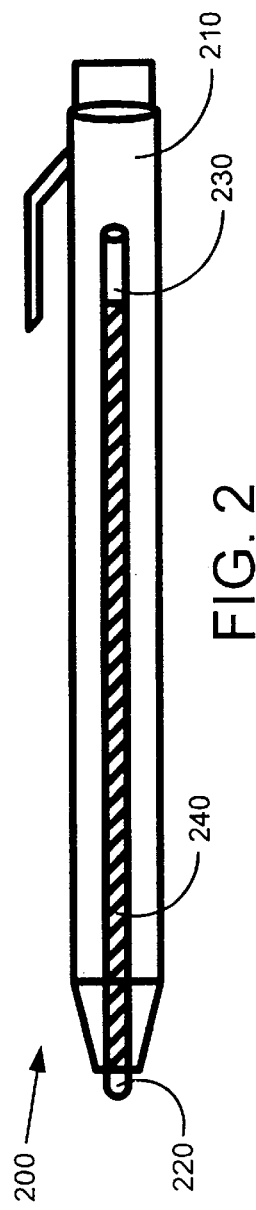
FIG. 2 illustrates a manual marking device of the present invention.

FIG. 2 illustrates a manual marking device of the present invention. The manual marking device 200, which can be a writing implement such a pen or pencil, includes a body 210 having a tip 220. The body 210 houses a reservoir 230 containing a writing agent 240. For example, if the manual marking device 200 is a pen, the body 210 houses an ink reservoir containing a supply of ink. The ink is fluidically coupled to the tip 220 such that the ink flows through the tip 220 and onto a media. In the instance where the manual marking device 200 is a pencil, the body 210 houses a generally solid supply of suitable pencil writing material, which is typically some type of graphite containing a binder and can be a graphite rod that exits the body 210 at the tip 220 for deposit on the media.

In the present invention, the marking agent is a high-contrast marking agent that is contained within the manual marking device 200. In one embodiment, the device 200 is a pen and the high-contrast marking agent is contained within the reservoir, either without other substances or mixed with suitable pen ink. If the marking agent is mixed with suitable pen ink, the marking agent is preferably a chemical that does not affect the stability of the pen ink or impair normal usage of the pen. As one example, a fluorescein dye can be added to suitable pen ink to provide high contrast to distinguish the subsequent markings 125 from the original material 102 of FIG. 1.

In another embodiment where the manual marking device 200 is a pencil, the high-contrast marking agent is added to suitable pencil writing material, which is typically some type of graphite containing a binder. Markings are made on media by rubbing the graphite and binder combination off onto the media. The high-contrast marking agent can be added to the graphite and binder combination such that the stability and usage characteristics of the pencil are not significantly altered. When the marking agent/graphite/binder combination is applied to media, both the graphite and the high-contrast marking agent are deposited on the media.

IV. Machine Marking Devices

Figure 3:
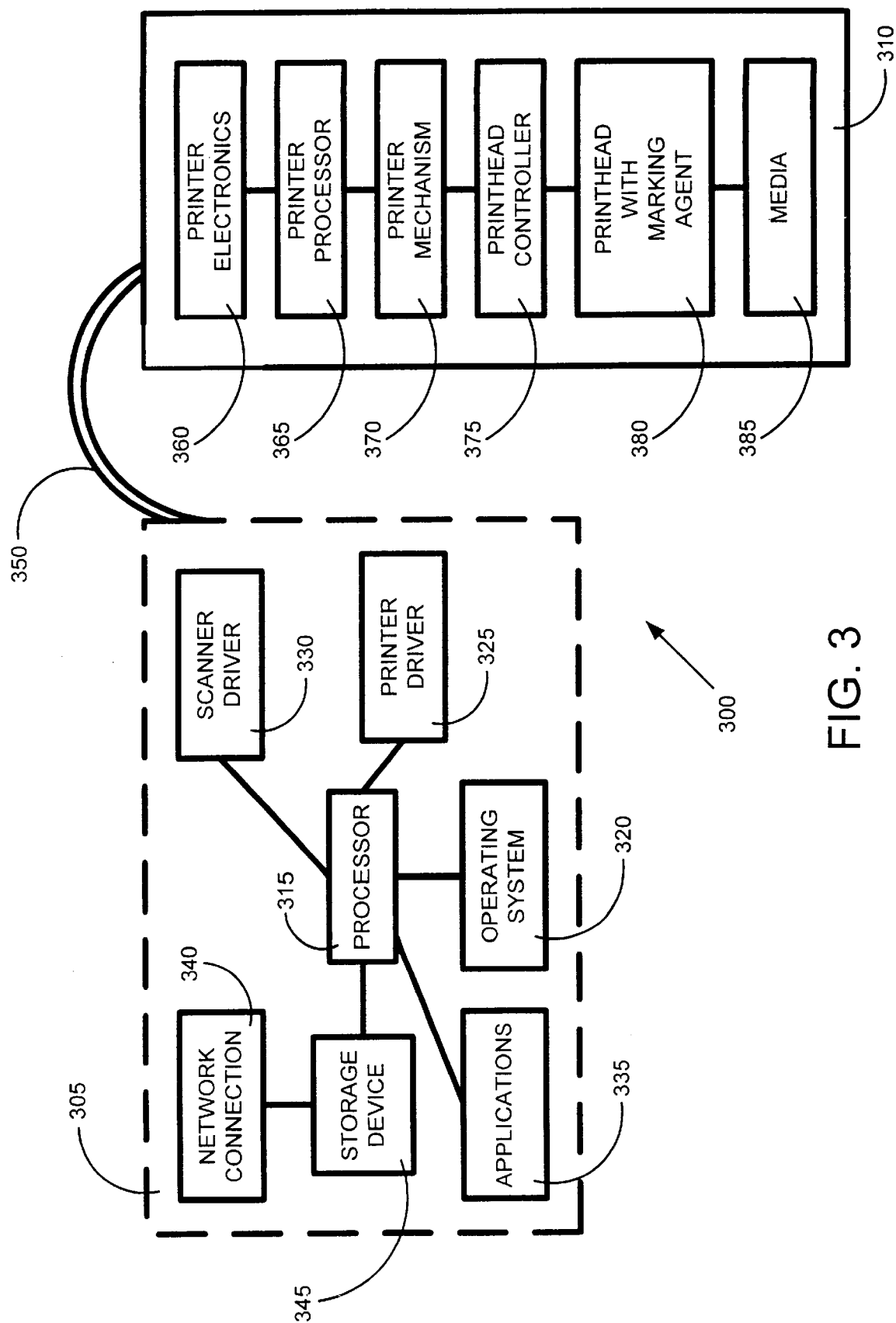
FIG. 3 illustrates a machine marking device of the present invention.

FIG. 3 illustrates a machine marking device of the present invention. The machine marking device 300 includes a computer 305 and a printing system 310. The computer 305 can include a processor 315, an operating system 320, a printer driver 325, a scanner driver 330, applications 335, a network connection 340 and a storage device 345. The printing system 310 can include printer electronics 360, a printer computer processor 365, a printer mechanism 370, a printhead controller 375, a printhead with a marking agent 380 and media 385. The operating system 320, printer driver 325, scanner driver 330 and applications 335 can be suitable software or firmware.

The processor 315 controls operations and commands of the computer 305, while the operating system 320 provides control over the various applications 335, drivers 330, 325 and the storage device 345, residing on the computer 305 and intercommunications between the computer 305 and the printer 310 and network connections 340. In particular, the printer driver 325 and the scanner driver 330 allow the computer 305 to interact with, respectively, the printing system 310 and a digital scanning device (not shown). The applications 335 residing on the computer 305 allow a variety of computer software programs to manipulate data, while a network connection 340 provides access to a local area network (LAN) or a wide area network (WAN) for electronic distribution of data and documents and also network communications.

The printing system 310 is coupled to the computer 305 by a suitable type of connection 350 that permits data transfer between the two. The printer electronics 360 contain various sub-systems of the printing system 310 and the printer processor 365 provides control and processing power to the printer. The printer mechanism 370, can be for instance, a print carriage (with a motor) for holding ink pens that dispense ink onto the media 385. The printhead 380 can be contained on the printer mechanism 370 and the printhead controller 375 controls the location and dispersion of the ink on the media 385. The printhead 380 preferably includes a marking agent, such as the high-contrast marking agent. The high-contrast marking agent can be stored in an ink reservoir (not shown) as a sole agent or mixed with suitable printer ink. Alternatively, the marking agent can be stored in a separate ink reservoir apart from the printer ink for selective dispensing of the marking agent and the printer ink on the media 385 during the printing process.

In an alternate embodiment, the printing system 310 is self-contained and does not require a connection to the computer system 305. In another alternate embodiment, the machine marking device 300 can be a typewriter (not shown) having a typewriter ribbon containing the high-contrast marking agent.

V. Marking Agents

The present invention is further embodied in a marking agent. The marking agent can be any suitable marking agent, such as a high-contrast marking agent that is deposited on a media. The marking agent is deposited on the media as a subsequent marking. When the subsequent marking containing the marking agent is illuminated, the marking agent radiates electromagnetic energy and can therefore be easily distinguished from the original material on the document.

As one example, the marking agent can be a chemical that emits electromagnetic waves at certain radiation set of frequencies when exposed to another set of electromagnetic waves at illumination frequencies. These two sets of frequencies may be the same frequency or different frequencies. For instance, the marking agent can be a high-contrast marking agent, such as a fluorescent ink whose radiation frequency range is in the visible light range. This means that the fluorescent ink emits visible light when illuminated with electromagnetic waves at an illumination frequency. Typically, this illumination frequency set is in the ultraviolet range so that ultraviolet light is used to illuminate the fluorescent ink such that it emits visible light.

Alternatively, the marking agent could be clear and thus invisible until illuminated with the proper illumination frequency. The chemicals that can be used as marking agents as well as the accompanying radiation frequencies and illumination frequencies can be any suitable chemicals and frequencies and will not be discussed in detail.

VI. Illumination Scanning Device

Figure 4:
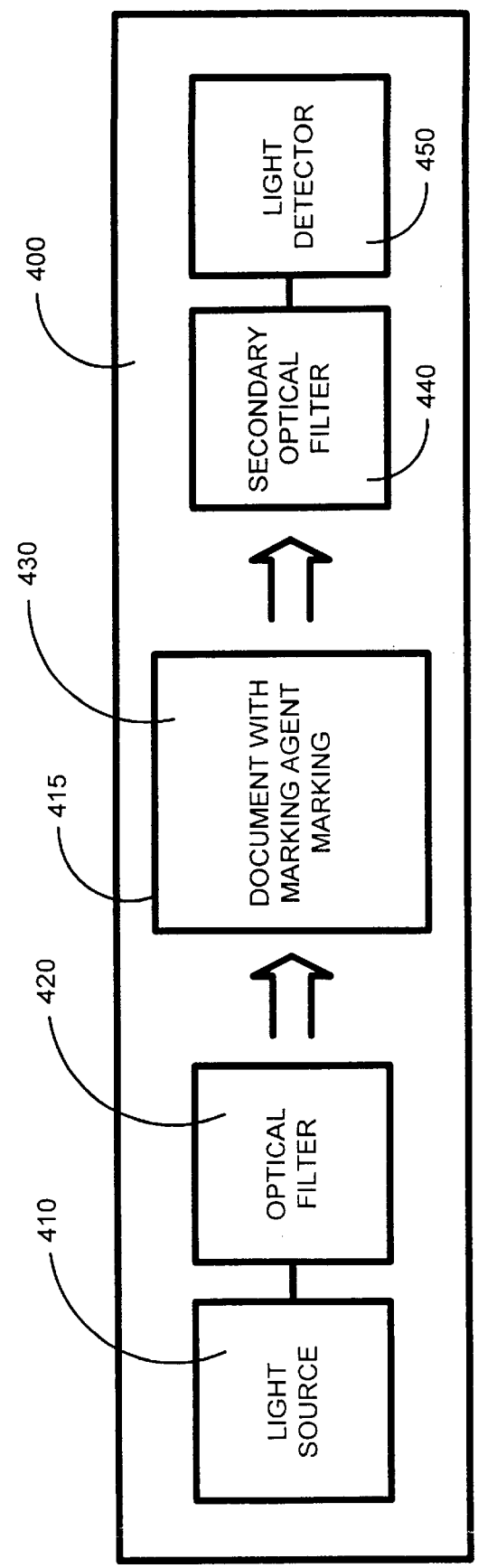
FIG. 4 illustrates a modified illumination digital scanning device of the present invention.

FIG. 4 illustrates a modified illumination digital scanning device of the present invention. In general, the scanning device 400 (an example of element 130 of FIG. 1) is used to provide an illumination frequency set capable of causing the high-contrast marking agent to radiate at a set of radiation frequencies. The scanning device 400 detects this radiation using a suitable detector 450 at the radiation set of frequencies of the marking agent and provides this information to a converter (not shown), which converts the detected radiation into a digital form.

In particular, the scanning device 400 includes a light source 410 for illuminating a media 415 containing the high-contrast marking agent. The light source 410 emits radiation at a set of illumination frequencies capable to cause the marking agent to radiate. In an alternative embodiment, an optical filter 420 is placed between the light source 410 and the media 415. The optical filter 420 can be a band-pass filter that blocks substantially all frequencies of radiation except for the required illumination frequencies. Thus, it is possible to have a light source 410 containing multiple frequencies used in conjunction with the optical filter 420 to provide the illumination frequencies.

In another embodiment, the light source 410 can be a plurality of light sources. As an example, a first light source could emit radiation at the illumination frequencies, a second light source could emit radiation at other illumination frequencies and a third light source could emit radiation at still other illumination frequencies. As discussed below, this arrangement allows several different high-contrast marking agents to be used on the same marked-up document 430.

In yet another embodiment, the light source 410 can be a multi-frequency light source that emits a specific set of frequencies. For example, a dual light source could include two different gases within a bulb such that the source would emit two different sets of frequencies of radiation (such as an ultraviolet light and a visible light set). These dual frequencies could be set to coincide with illumination frequencies of two different marking agents, thereby permitting the use of different "planes" of markings. These multiple information planes are discussed in detail below.

In all cases, the radiation emitted by the marking agent during illumination by the light source 410 is detected by a light detector 450. The light detector can be a charge-coupled device (CCD) that detects the emitted radiation, A secondary optical filter 440 can be used between the light detector 450 and the document 430 containing the markings to further filter the radiation detected by the light detector 450.

VII. Other Marking Agents

Figure 5:
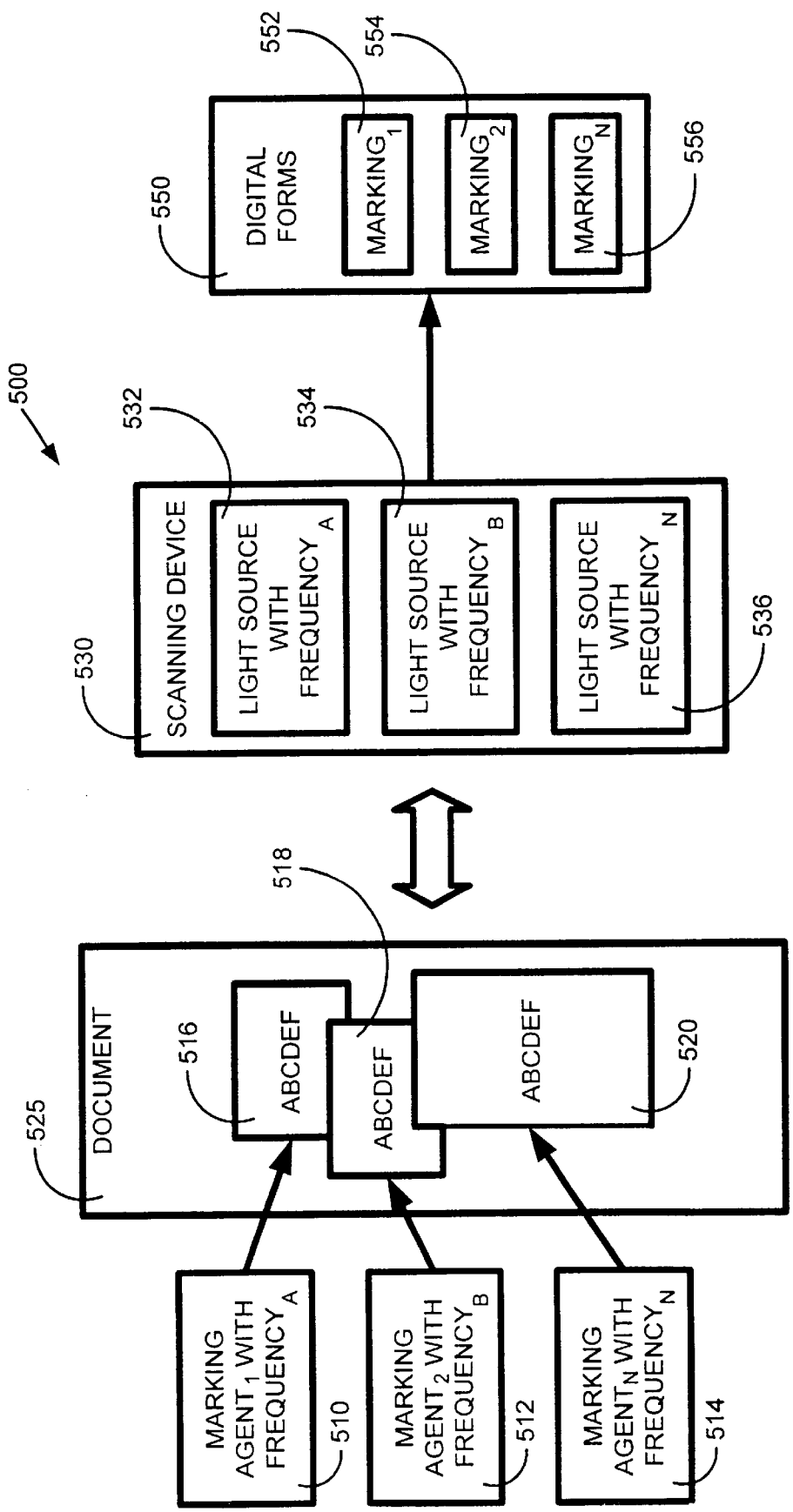
FIG. 5 is a block diagram of an alternative embodiment of the marking agent of the present invention.

FIG. 5 is a block diagram of an alternative embodiment of the marking agent of the present invention. The present invention is further embodied in a system 500 for using a plurality of marking agents 510, 512, 514, such as plural high-contrast marking agents, each responding or reflecting a different set of illumination frequencies. Thus, it is possible to create multiple information planes 516, 518, 520 on a document 525 by using different combinations of marking agents and illumination sources. For example, manual marking devices (such as pens), each containing a different color marking agent could be used to mark the original document. This could include editorial marks by different persons, each using a different color pen, or different colors used to represent different systems. For instance, on architectural drawings, a certain color could represent the electrical system while another color could represent the plumbing system.

These different planes of information 516, 518, 520, as represented by different marking agents with different illumination frequencies, could be detected by a scanning device 530 containing multiple frequency light sources or a plurality of optical filters 532, 534, 536. As described above, the use of these light sources or optical filters, either alone or in combination, would provide a high degree of distinction between the planes 516, 518, 520 of information when the marking agent was illuminated at its correct illumination frequency set. The multiple planes are distinguished and converted into a digital form 550 comprised of separate digital forms 552, 554, 556 by the scanning device 530, wherein each digital form is represented by respective markings. Consequently, accurate conversion of the markings is produced even if the markings overlap or blend with the each other.

In another alternate embodiment, the marking agent can be invisible under normal lighting conditions to the human eye, thereby allowing invisible marking. This type of marking on a document would preferably remain invisible until the marking agent was illuminated by a suitable scanning device at the appropriate illumination frequency set.

From the foregoing, it will be appreciated that the system and method of the present invention offer numerous advantages. In particular, the present invention allows unique data that is added to an original document to be converted into a digital form for manipulation by computer software applications and electronic distribution. Moreover, the present invention provides accurate and efficient conversion of subsequent markings by utilizing a high-contrast system and technique whereby the markings are separable from original material by the scanning device. Thus, illegible and ambiguous marks can be more easily distinguished from the original material to allow accurate detection of the subsequent markings by the scanning device.

The foregoing has described the principles, preferred embodiments and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A digital conversion system for digitally converting an original document containing original material on an original plane and subsequent edit markings on other planes different from the original plane, comprising:

at least one marking agent that creates the subsequent edit markings, each marking agent being associated with a respective readable plane different from other planes, and wherein each plane radiates a specific set of radiation frequencies distinguishable from any radiation frequencies radiated by the other planes and the original plane; and a detector having multiple light sources, each light source being associated with each plane, wherein the detector detects and converts the radiation frequencies of the planes into a digital form representing the subsequent markings and the original material.

2. The digital conversion system of claim 1, wherein the marking agent is high-contrast marking agent.

3. The digital conversion system of claim 1, wherein the detector includes a radiation source that radiates electromagnetic energy at an illumination frequency set and causes the marking agent to radiate electromagnetic radiation at a detectable radiation frequency set.

4. The digital conversion system of claim 3, further comprising an optical filter located between the radiation source and the document and being capable of filtering substantially all frequencies except the illumination frequency set.

5. The digital conversion system of claim 4, further comprising a secondary optical filter located between the document and the detector.

6. The digital conversion system of claim 1, further comprising a marking device for dispensing the marking agent.

7. The digital conversion system of claim 6, wherein the marking device is a manual marking device.

8. The digital conversion system of claim 7, wherein the manual marking device is a pen marking device.

9. The digital conversion system of claim 7, wherein the manual marking device is a pencil marking device.

10. The digital conversion system of claim 6, wherein the marking device is a machine marking device.

11. The digital conversion system of claim 10, wherein the machine marking device is a computer controlled printer marking device.

12. The digital conversion system of claim 10, wherein the machine marking device is a typewriting marking device.

13. The digital conversion system of claim 1, wherein the document contains original material capable of radiating a different radiation frequency set than the marking agent.

14. The digital conversion system of claim 1, wherein the marking agent comprises a plurality of marking agents each having a different illumination frequency.

15. The digital conversion system of claim 14, further comprising a radiation source that radiates electromagnetic radiation at the respective different illumination frequency set of each of the marking agents.

16. The digital conversion system of claim 14, further comprising a plurality of optical filters each corresponding to the respective different illumination frequency of each of the marking agents.

17. The digital conversion system of claim 14, further comprising a plurality of radiation sources, each radiation source radiating electromagnetic radiation at the respective different illumination frequency set of each of the marking agents.

18. A method for digitally converting markings, comprising:

associating original material with an original plane and at least one set of subsequent markings with its own respective distinct plane different from the original plane and other sets of subsequent markings;

forming at least one handwritten marking from the at least one set of subsequent markings over the original material located on a media with at least one marking agent; and illuminating each plane with multiple light sources of a detector to cause information associated with each plane to emit radiation at a radiation frequency set that is distinguishable from any radiation frequencies radiated by the other planes and the original plane.

19. The method of claim 18, wherein the marking agent comprises a plurality of marking agents each having a different illumination frequency set.

20. The method of claim 19, wherein illuminating the marking comprises illuminating the marking so as to cause the plural marking agents to emit radiation at the respective different illumination frequency set of each of the marking agents.

21. The method of claim 18, wherein the marking agent is high-contrast marking agent.

22. An apparatus for digitally converting information located on an original document containing original material on an original plane and subsequent edit markings on other planes, comprising:

a marker for creating markings interlineated and intermingled with existing material located on the original document, wherein each marking is associated with its own distinct plane different from the original plane and other planes and wherein the created markings of each plane emit radiation at a radiation frequency set that is distinguishable from any radiation frequencies radiated by other markings of other planes and the existing material on the original plane; and a converter having multiple lights sources, each light source being associated with each plane for distinguishing the markings from each plane and separately processing and converting the markings into a digital form from the information on the original document.

23. The apparatus of claim 22, wherein the converter optically distinguishes the markings from the existing material.

24. The apparatus of claim 23, wherein the marker creates the markings with a marking agent.

25. The apparatus of claim 24, wherein the marking agent is a high-contrast marking agent.

26. The apparatus of claim 25, wherein the converter radiates electromagnetic energy at an illumination frequency set and causes the marking agent to radiate electromagnetic radiation at a detectable radiation frequency set.

* * * * *